(12) United States Patent
Wilson et al.

(10) Patent No.: US 11,917,012 B2
(45) Date of Patent: Feb. 27, 2024

(54) SYSTEM AND METHOD FOR A REAL-TIME APPLICATION PROGRAMMING INTERFACE BROKER SERVICE ACROSS CLOUD SERVICE PROVIDERS

(71) Applicant: Dell Products L.P., Hopkinton, MA (US)

(72) Inventors: Lucas Avery Wilson, Cedar Park, TX (US); Dharmesh M. Patel, Round Rock, TX (US)

(73) Assignee: Dell Products L.P., Austin, TX (US)

( * ) Notice: Subject to any disclaimer, the term of this patent is extended or adjusted under 35 U.S.C. 154(b) by 231 days.

(21) Appl. No.: 17/363,603

(22) Filed: Jun. 30, 2021

(65) Prior Publication Data

US 2023/0007096 A1   Jan. 5, 2023

(51) Int. Cl.
*G06F 16/23* (2019.01)
*H04L 67/133* (2022.01)
*G06F 16/25* (2019.01)

(52) U.S. Cl.
CPC ............ *H04L 67/133* (2022.05); *G06F 16/23* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 2013/0132584 A1* | 5/2013 | Palladino | G06F 8/30 709/226 |
| 2015/0100660 A1* | 4/2015 | Flack | H04L 67/1095 709/213 |
| 2020/0280612 A1* | 9/2020 | Boeker | H04L 63/083 |
| 2022/0334852 A1* | 10/2022 | Bermundo | G06F 9/451 |

* cited by examiner

*Primary Examiner* — Craig C Dorais
(74) *Attorney, Agent, or Firm* — Chamberlain, Hrdlicka, White, Williams & Aughtry; Aly Z. Dossa

(57) ABSTRACT

A method for managing cloud service providers (CSPs) includes obtaining, by a CSP application broker, an application programming interface (API) request from an application, performing a target CSP analysis to identify a target CSP to service the API call, performing an API call modification based on the target CSP to obtain a CSP API call, sending the CSP API call to the target CSP, obtain a target API response from the target CSP, perform a CSP API response modification to obtaining a modified API response, and sending the translated API response to the application, wherein the application and the CSP application broker operate in the CSP.

17 Claims, 5 Drawing Sheets

SYSTEM AND METHOD FOR A REAL-TIME APPLICATION PROGRAMMING INTERFACE BROKER SERVICE ACROSS CLOUD SERVICE PROVIDERS

BACKGROUND

Computing devices in a system may include any number of internal components such as processors, memory, and persistent storage. Cloud service providers may host applications that provide services for users. The cloud service providers may utilize any number of computing devices. The computing devices of a cloud service provider may include functions that are specific to a cloud service provider.

SUMMARY

In general, in one aspect, the invention relates to a method for managing a cloud service provider (also referred to as a CSP). The method includes obtaining, by a CSP application broker, an application programming interface (API) request from an application, performing a target CSP analysis to identify a target CSP to service the API call, performing an API call modification based on the target CSP to obtain a CSP API call, sending the CSP API call to the target CSP, obtain a target API response from the target CSP, perform a CSP API response modification to obtain a modified API response, and sending the translated API response to the application, wherein the application and the CSP application broker operate in the CSP.

In general, in one aspect, the invention relates to a non-transitory computer readable medium that includes computer readable program code, which when executed by a computer processor enables the computer processor to perform a method for managing cloud service providers (CSPs). The method includes obtaining, by a CSP application broker, an application programming interface (API) request from an application, performing a target CSP analysis to identify a target CSP to service the API call, performing an API call modification based on the target CSP to obtain a CSP API call, sending the CSP API call to the target CSP, obtain a target API response from the target CSP, perform a CSP API response modification to obtain a modified API response, and sending the translated API response to the application, wherein the application and the CSP application broker operate in the CSP.

In general, in one aspect, the invention relates to a system that includes a processor and memory that includes instructions, which when executed by the processor, perform a method. The method includes obtaining, by a CSP application broker, an application programming interface (API) request from an application, performing a target CSP analysis to identify a target CSP to service the API call, performing an API call modification based on the target CSP to obtain a CSP API call, sending the CSP API call to the target CSP, obtain a target API response from the target CSP, perform a CSP API response modification to obtaining a modified API response, and sending the translated API response to the application, wherein the application and the CSP application broker operate in the CSP.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
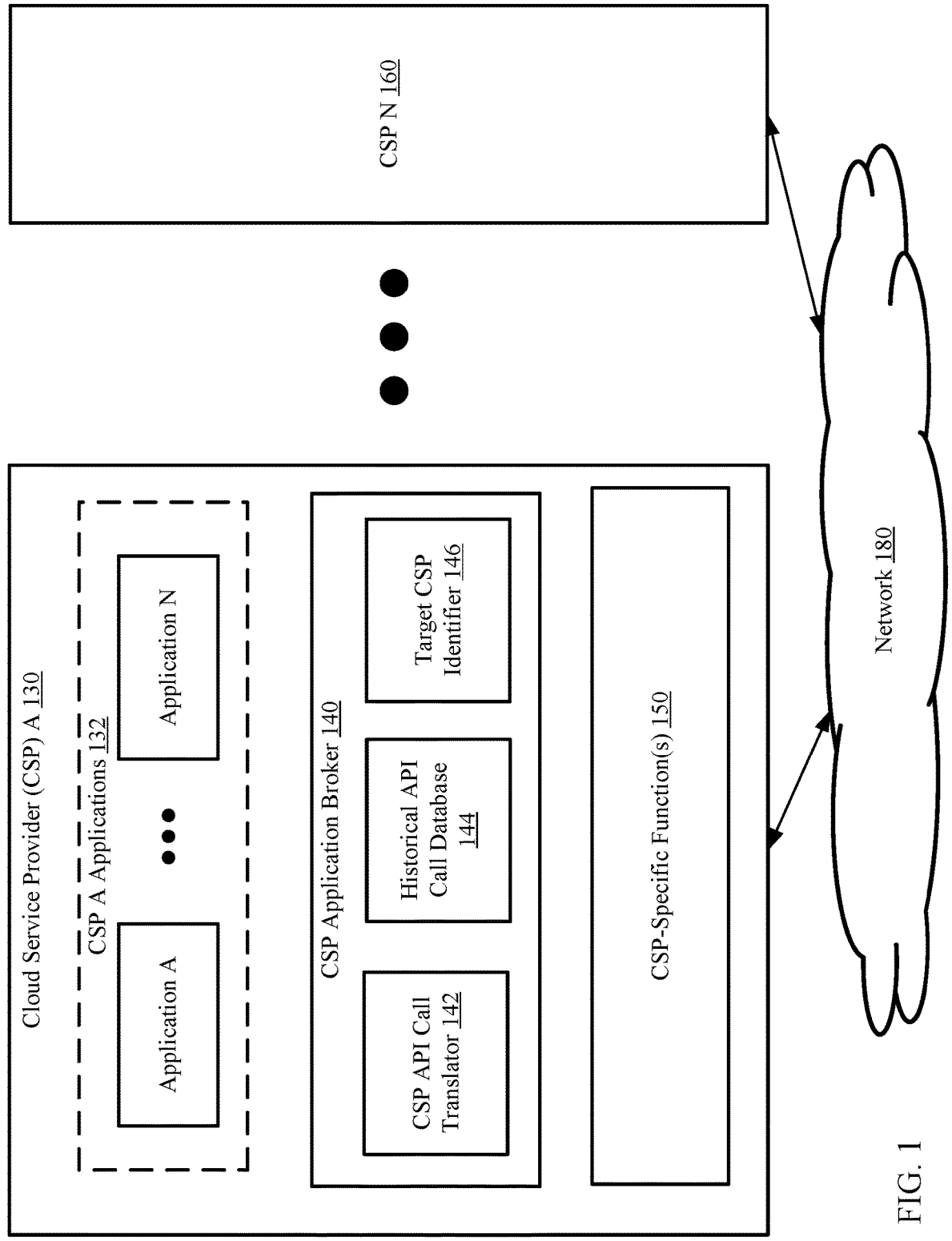
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for managing cloud service providers. Specifically, embodiments of the invention relate to a method for brokering application programming interface (API) calls across multiple cloud service providers (CSPs). The API calls may be initiated by an application of a first cloud service provider to a CSP-specific function in a second CSP. The API calls may be brokered using a CSP application broker. The CSP application broker may obtain an API call to be performed by a function. The CSP application broker may identify a CSP-specific function to service the API call. The identification may be based on historical API call behaviors and/or previous selections. The identified CSP-specific function may be one of a second CSP. In such scenarios, the CSP application broker may perform a translation to the API call based on the function protocol of the second CSP. The translated API call may be provided to the identified function, and an API response may be obtained. The obtained API response may be translated based on the native application protocol of the CSP in which the CSP application broker operates.

In one or more embodiments of the invention, additional metrics based on the servicing of the API call by the second CSP may be obtained and stored by the CSP application broker. The additional metrics may specify usage information of the computing resources in the CSP by the identified function. Further, the additional metrics may specify the incurred cost on the application. The incurred cost may include for example, any financial cost incurred on the application for the utilization of a function for a second CSP. Additionally, the cost may specify a latency cost (e.g., the time taken for the API call to be serviced following the translation and sending by the CSP application broker. In one or more embodiments of the invention, such additional metrics may be used by the CSP application broker for future identifications of CSP-specific functions of future API calls.

FIG. 1 shows an example system in accordance with one or more embodiments of the invention. The system includes two or more cloud service providers (130, 160) connected via a network (180). The system may include additional, fewer, and/or different components without departing from the invention. Each cloud service provider (CSP) (130, 160) includes one or more applications (132), a CSP application broker (140), and any number of CSP-specific functions (150). Each component may be operably connected to any of the other components via any combination of wired and/or wireless connections. Each component illustrated in FIG. 1 is discussed below.

In one or more embodiments of the invention, the cloud service provider (130) host applications (132) (also referred to as CSP applications). The applications (132) may be logical entities executed using computing resources (not shown) of the cloud service provider (130). Each of the applications (132) may be performing similar or different processes. In one or more embodiments of the invention, the applications (132) provide services to users, e.g., clients (not shown). The applications may be, for example, instances of databases, email servers, and/or other applications without departing from the invention. In one or more embodiments of the invention, the CSP applications (132) utilizes the services of CSP-specific functions (150) (further discussed below).

In one or more embodiments of the invention, the applications (132) are implemented as computer instructions, e.g., computer code, stored on a persistent storage that when executed by a processor(s) of a computing device (see, e.g., FIG. 4) cause the computing device to provide the functionality of the applications (132) described throughout this application.

In one or more embodiments of the invention, the CSP application broker (140) manages commands initiated by the CSP applications (132). The commands may be implemented as API calls sent by one of the CSP applications (132). To perform the aforementioned functionality, the CSP application broker (140) may include a CSP API call translator (142), a historical API call database (144), and a target CSP identifier (146). The CSP application broker (140) may include additional, fewer, and/or different components without departing from the invention.

In one or more embodiments of the invention, the CSP API call translator (142) translates API calls and/or API response from a first CSP protocol to a second CSP protocol. The translation may be based on the CSP to which the CSP application broker intends to send the API call and/or API response. For example, if the CSP application broker (140) is to send an API call to a second CSP (e.g., 160), the CSP API call translator (142) may translate the API call to a format readable using a CSP protocol of a CSP-specific function of the second CSP (160). The translations of the API calls and/or API responses may be performed in accordance with FIG. 2A.

In one or more embodiments of the invention, the historical API call database (144) is a data structure that stores metrics corresponding to previous API calls. The previous API calls may be such API calls serviced by the CSP (130) or by other CSPs (e.g., 160) in the system. The metrics may specify information regarding the API calls. Such information may include, but is not limited to, the financial cost of performing the API call, the latency cost (e.g., time taken to perform the API call), the CSP(s) utilized to complete the API call, and the computing resource use of the computing devices performing the function(s). Such metrics stored in the historical API call database (144) may be used by the CSP application broker (140) to identify future CSPs for future API calls. In one or more embodiments of the invention, the historical API call database (144) may further include information regarding the CSP-specific functions (150) of other CSPs and their predicted costs (either financial, latency-related, etc.).

In one or more embodiments of the invention, the target CSP identifier (146) includes functionality for identifying a target CSP to perform an obtained API call. The target CSP identifier (146) may perform the identification in accordance with the method of FIG. 2A.

In one or more of embodiments of the invention, the CSP application broker (140) are implemented as computer instructions, e.g., computer code, stored on a persistent storage that when executed by a processor(s) of a computing device (see, e.g., FIG. 4) cause the computing device to provide the functionality of the CSP application broker (140) described throughout this application.

In one or more embodiments of the invention, the CSP application broker (140) is implemented as a logical device. The logical device may utilize the computing resources of any number of computing devices and thereby provide the functionality of the CSP application broker (140) described throughout this application.

In one or more embodiments of the invention, the CSP-specific functions (150) provide functionality to the CSP applications (132). The CSP-specific functions (also referred to as functions) may provide the functionality using computing resources of the corresponding CSP (130). The applications (132) may utilize the computing resources of the CSP (130) via the CSP-specific functions (150). The usage of the computing resources via the CSP-specific functions (150) may be based on previously-agreed upon terms between the users of the applications (132) and the owners/operators of the CSP (130). For example, the user may be subscribed to a monthly subscription to one or more of the CSP-specific functions (150). Examples of CSP-specific functions include, but are not limited to: data processing of data generated by the applications (132), monitoring network traffic for the applications (132), managing user logins for the users of the applications (132), and providing security functions.

In one or more embodiments of the invention, the cloud service provider (130) is implemented as a logical device. The logical device may utilize the computing resources of any number of computing devices and thereby provide the functionality of the cloud service provider (130) described throughout this application.

Figure 2A:
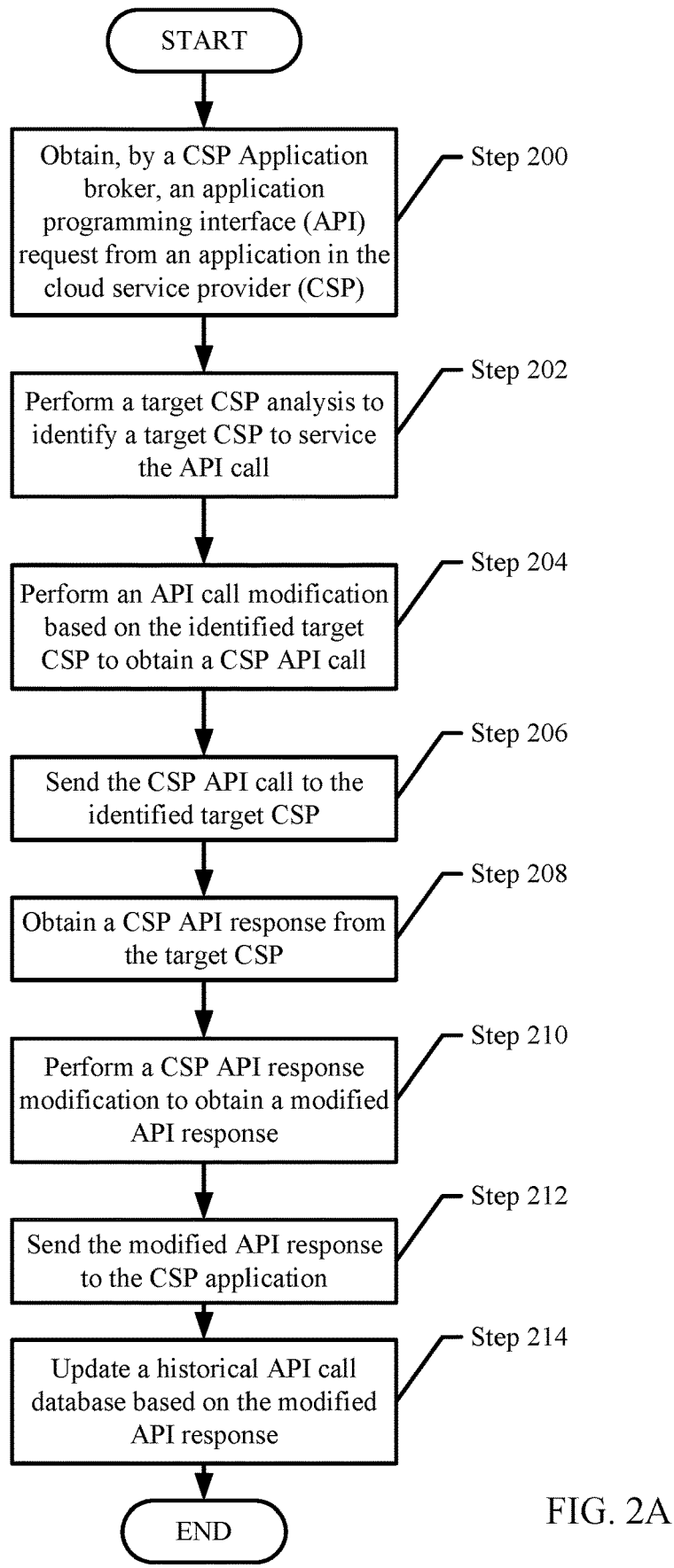
FIG. 2A shows a flowchart for managing application programming interface (API) calls in accordance with one or more embodiments of the invention.
Figure 2B:
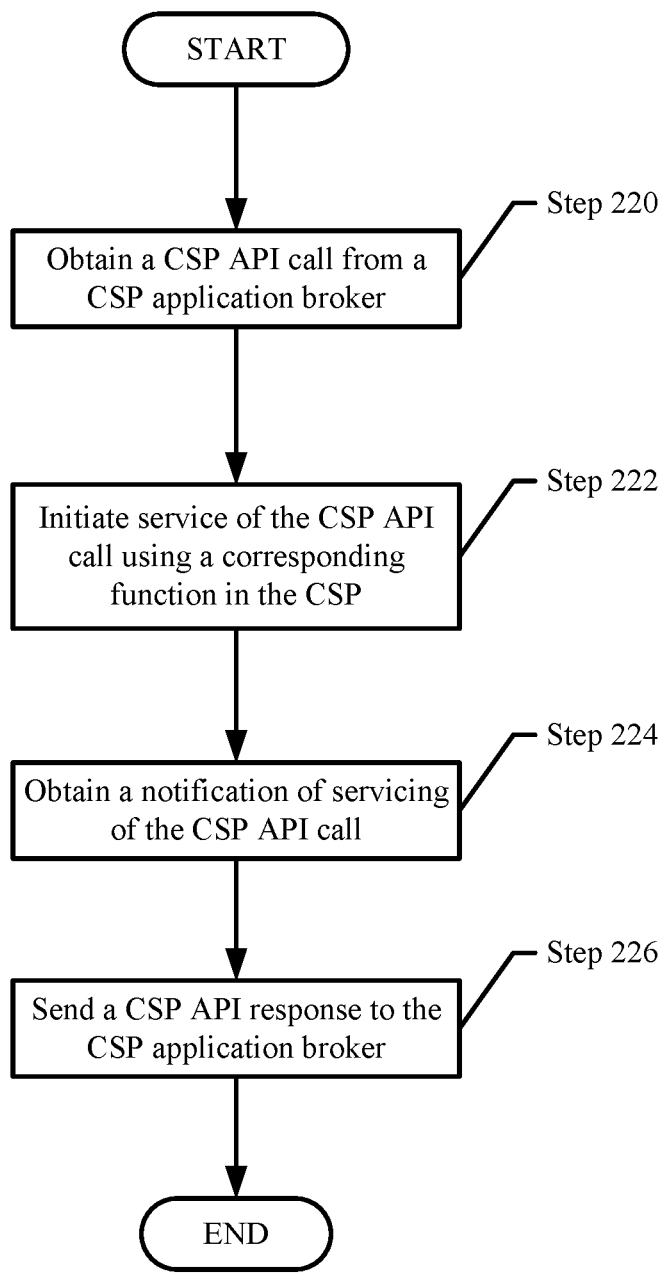
FIG. 2B shows a flowchart for managing translated API calls in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for processing API calls in accordance with one or more embodiments of the invention. The method shown in FIG. 2A may be performed by, for example, a CSP application broker (140, FIG. 1). Other components of the system illustrated in FIG. 1 may perform the method of FIG. 2A without departing from the invention.

Turning to FIG. 2A, in step 200, an application programming interface (API) request is obtained from an application in the CSP. In one or more embodiments of the invention, the API call includes a request to utilize a function for the operation of the application. The function may provide functionalities of, for example, performing data processing, monitoring network traffic for a specified period of time, managing the logins of users for the application, performing security functions, and/or any other functions without departing from the invention.

In one or more embodiments of the invention, the API call includes a function call and a set of parameters. The function call and the set of parameters may be in a format readable using a CSP protocol of the CSP in which the function operates.

In step 202, a target CSP analysis is performed to identify a target CSP to perform the API call. In one or more embodiments of the invention, the target CSP analysis includes analyzing the historical API call database to determine potential CSP-specific functions that may service the API call. For example, the historical API call database may specify a function, operating in a second CSP, capable of servicing the API call. The historical API call database may further specify the financial cost, latency cost of the function in the second CSP servicing the API call. The CSP application broker may use the aforementioned information to determine that the function, operating in the second CSP, is the optimal function to service the API call. Following the determination, the second CSP is identified as the target CSP.

In step 204, a CSP API modification is performed on the API call based on the target CSP to obtain a CSP API call. In one or more embodiments of the invention, the CSP API modification is a process for generating the CSP API call using the function call and parameters of the API call. The function call and parameters are used to populate the CSP API call that matches the protocol of the target CSP in which the function operates. In this manner, the CSP API call is readable to the aforementioned function.

In step 206, the CSP API call is sent to the identified target CSP. In one or more embodiments of the invention, the CSP API call may be sent directly to the CSP-specific function operating in the identified target CSP. Alternatively, the CSP API call may be sent to a second CSP application broker operating in the target CSP.

In step 208, a CSP API response is obtained from the target CSP. In one or more embodiments of the invention, the CSP API response specifies the servicing (or lack thereof) of the API call. Further, the CSP API response may specify additional metrics corresponding to the servicing. For example, the additional metrics may include a timestamp indicating when the API call was serviced, the computing resources used to perform the CSP-specific function, the financial cost for the CSP-specific function to service the API call, and/or any other metrics without departing from the invention. The CSP API response may be in a format readable to the CSP hosting the CSP-specific function.

In step 210, a CSP API response modification is performed to obtain a modified API response. The modified API response may be generated by populating an API response that matches the protocol of the CSP in which the application sending the API call operates. The modified API response may specify the information included in the obtained CSP response.

In step 212, the modified API response is sent to the CSP application. In one or more embodiments of the invention, by sending the modified API response, the application is notified of the servicing (or, in some occasions, the lack thereof) of the API call initially sent by the application. By providing the modified API response in a format readable to the protocol of the CSP in which the application operates, the application has no need to be aware of the function servicing the API call as one being in a different CSP.

In step 214, the historical API call database is updated based on the modified API response. In one or more embodiments of the invention, the historical API call database is updated based on the obtained additional metrics discussed above.

FIG. 2B shows a flowchart for managing translated API calls in accordance with one or more embodiments of the invention. The method shown in FIG. 2B may be performed by, for example, a CSP-specific function (e.g., 150, FIG. 1) of a CSP (e.g., 160, FIG. 1). Other components of the system illustrated in FIG. 1 may perform the method of FIG. 2B without departing from the invention.

In step 220, a CSP API call is obtained from a CSP application broker. The translated CSP API may be the one discussed in steps 204 and 206. Such CSP API call may be in a format readable using the CSP protocol of the CSP-specific function performing the method of FIG. 2B.

In step 222, servicing of the CSP API call is initiated using a corresponding function in the CSP. In one or more embodiments of the invention, the servicing includes providing the computing resources of the CSP to perform the requested function specified in the CSP API call. The servicing may be performed by the CSP-specific function of the CSP.

In step 224, a notification of servicing of the CSP API call is obtained. In one or more embodiments of the invention, the CSP-specific function may generate a notification that specifies the servicing (or lack thereof) of the CSP API call.

In step 226, a CSP API response is sent to the CSP application broker. In one or more embodiments of the invention, the CSP API response may include the generated notification. Specifically, the CSP API response may specify the servicing (or lack thereof) of the CSP API call. Further, the CSP API response may specify additional metrics corresponding to the servicing. The CSP API response may be in a format readable to the CSP hosting the CSP-specific function.

Example

Figure 3:
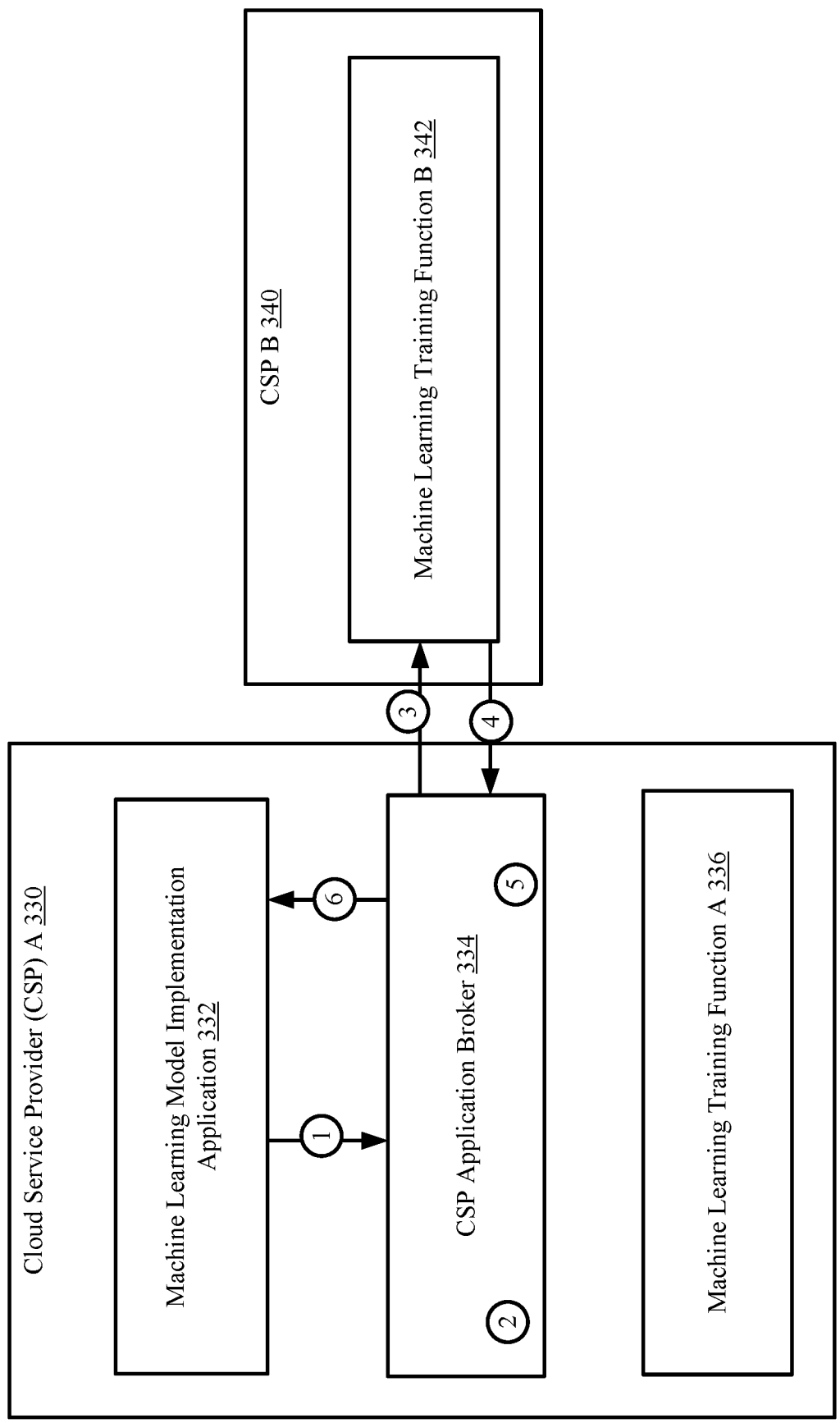
FIG. 3 shows an example in accordance with one or more embodiments of the invention.

The following section describes an example. The example, illustrated in FIG. 3, is not intended to limit the invention and is independent from any other examples discussed in this application. Turning to the example, consider a scenario in which a machine learning model implementation application is executing on a first cloud service provider (CSP).

FIG. 3 shows an example system in accordance with one or more embodiments of the invention. For the sake of brevity, not all components of the example system may be illustrated. The example system includes CSP A (330) and CSP B (340) connected via a network (not shown). CSP A (330) provides the computing resources for the machine learning model implementation application (332) to execute. The machine learning model implementation application (332) requires to utilize a machine learning training function using training data to improve the machine learning model. The machine learning model implementation application (332) sends an API call to be serviced by a machine learning training function (342) [1].

CSP A (330) further includes a CSP application broker (334). The CSP application broker (334) may intercept the API call from the application (332). The API call may specify performing the machine learning training using a training data set. The CSP application broker (334) may perform the method of FIG. 2A to identify both machine learning training function A (336) and machine learning training function B (342). Specifically, the CSP application broker (334) utilizes a historical API call database (not shown) to determine the time spent to perform the machine learning training for each machine learning training function (e.g., 336, 342).

The CSP application broker (334) determines that the total time taken to perform the machine learning training is performed faster by machine learning training function B (342) than machine learning training function A (336). Based on this determination, and the fact that machine learning training function B (342) executes on CSP B (340), CSP application broker (334) identifies CSP B (340) as the target CSP. The CSP application broker (334) generates a CSP API call that is in a readable format for CSP B (340) [2]. The CSP application broker (334) sends the CSP API call to machine learning training function B (342) in CSP B (340) [3].

In response to obtaining the CSP API call, the machine learning training function (342) performs the machine learning training using the training data set stored in CSP B (340). Following the machine learning training function (342) performing the machine learning training, a CSP API response is produced by machine learning training function B (342). The CSP API response is intercepted by the CSP application broker (334) [4]. The CSP application broker (334) identifies the intended recipient of the CSP API response as the machine learning model implementation application (332).

Based on this identification, the CSP application broker (334) performs a CSP API response modification in accordance with the method of FIG. 2A. The result is a modified API response. The modified API response is provided to the machine learning model implementation application (332) [6]. The modified API response specifies the servicing of the machine learning training. The modified API response further includes the trained machine learning model. The machine learning model implementation application (332) may implement the obtained trained machine learning model.

Following the provided modified API response, the CSP application broker (334) stores an entry in the historical API call database that specifies the servicing of the API call. Additionally, the entry specifies additional metrics based on the servicing. The additional metrics include the time taken for the machine learning training function to train the machine learning model, the amount of data in the training dataset, the financial cost of utilizing CSP B (340) to perform the training, and the time taken to transfer the trained machine learning model to CSP A (330).

End of Example

Figure 4:
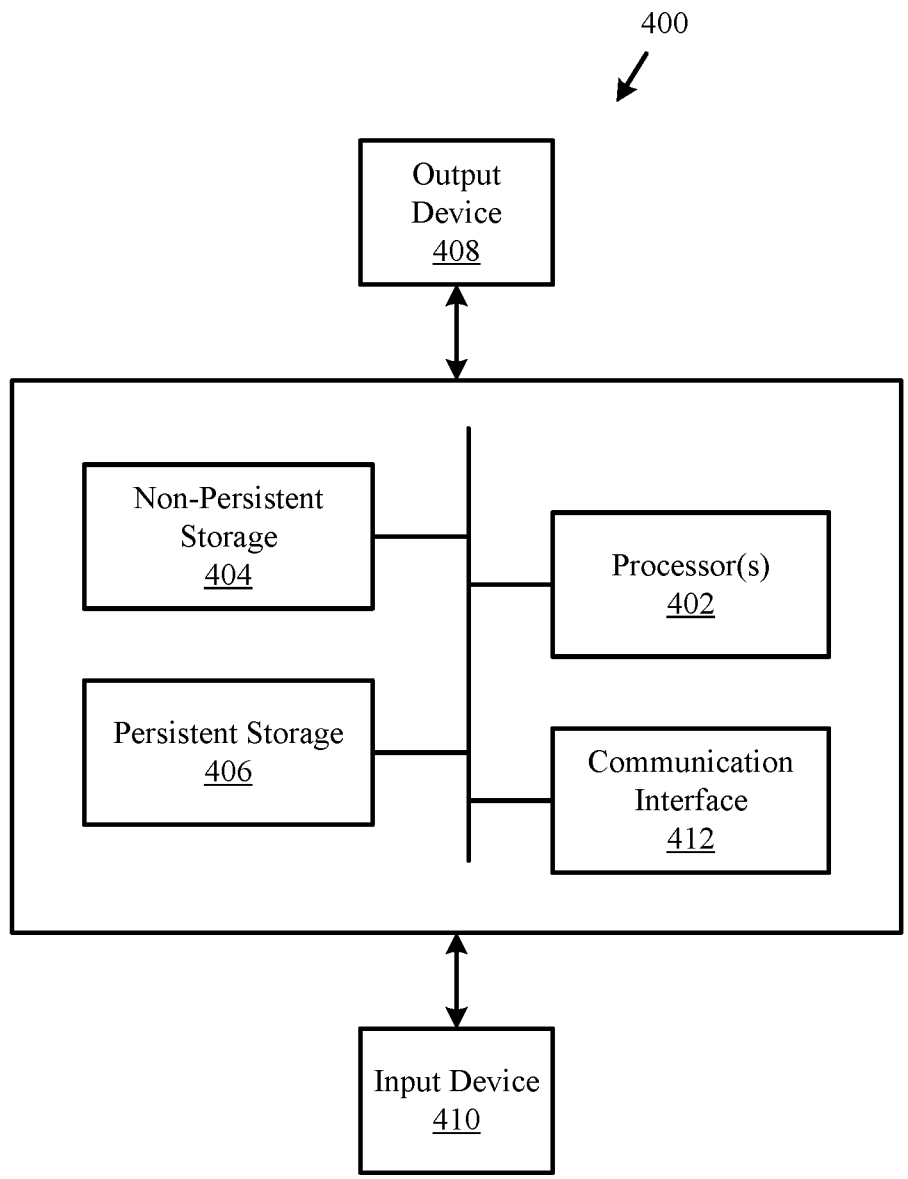
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention reduce the limitations of applications operating on a cloud service providers from utilizing functions of other cloud service providers if the second cloud service providers reduce the cost and/or improve the execution of the applications. Embodiments of the invention include providing a cloud service provider application broker that enable obtained API calls to be modified such that the other cloud service providers may execute the modified API calls. Any CSP responses obtained from the other CSP may be modified such that the application sending the initial API call determines how the API call is serviced. In this manner, the application does not need to modify its instructions to enable usage of other functions in other CSPs.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing cloud service providers (CSPs), the method comprising:
    obtaining, by a CSP application broker, an application programming interface (API) call from an application;
    performing a target CSP analysis to identify a target CSP to service the API call, wherein performing the target CSP analysis is based on a historical API call database;
    performing, based on the target CSP and on the API call, a CSP API call modification to obtain a CSP API call;
    sending the CSP API call to the target CSP;
    obtaining a CSP API response from the target CSP;
    performing, on the CSP API response, a CSP API response modification to obtain a modified API response; and
    sending the modified API response to the application,
    wherein the application and the CSP application broker operate in a CSP.

2. The method of claim 1, wherein the API call is in a format readable to the CSP, and wherein the CSP API call is in another format readable to the target CSP.

3. The method of claim 1, wherein the performing the target CSP analysis comprises:
    identifying a function associated with the API call;
    making a determination that the target CSP comprises the function; and
    based on the determination, selecting the target CSP.

4. The method of claim 3, wherein the function is specific to the target CSP.

5. The method of claim 3, the method further comprising:
    updating, based on the modified API response, the historical API call database to obtain an updated historical API call database;
    after updating the historical API call database:
        obtaining a second API call from the application;
        performing, using the updated historical API call database, a second target CSP analysis to identify a second target CSP to service the second API call;
        performing, based on the second target CSP and on the second API call, a second CSP API call modification to obtain a second CSP API call;
        sending the second CSP API call to the second target CSP;
        obtaining a second CSP API response from the second target CSP;
        performing, on the second CSP API response, a second CSP API response modification to obtain a second modified API response; and
        sending the second modified API response to the application.

6. The method of claim 1, wherein the target CSP and the CSP are operatively connected via a network.

7. A non-transitory computer readable medium comprising computer readable program code, which when executed by a computer processor, enables the computer processor to perform a method for managing cloud service providers (CSPs), the method comprising:
    obtaining, by a CSP application broker, an application programming interface (API) call from an application;
    performing a target CSP analysis to identify a target CSP to service the API call, wherein performing the target CSP analysis is based on a historical API call database;
    performing, based on the target CSP and on the API call, a CSP API call modification to obtain a CSP API call;
    sending the CSP API call to the target CSP;
    obtaining a CSP API response from the target CSP;
    performing, on the CSP API response, a CSP API response modification to obtain a modified API response; and
    sending the modified API response to the application,
    wherein the application and the CSP application broker operate in a CSP.

8. The non-transitory computer readable medium of claim 7, wherein the API call is in a format readable to the CSP, and wherein the CSP API call is in another format readable to the target CSP.

9. The non-transitory computer readable medium of claim 7, wherein the performing the target CSP analysis comprises:
    identifying a function associated with the API call;
    making a determination that the target CSP comprises the function; and
    based on the determination, selecting the target CSP.

10. The non-transitory computer readable medium of claim 9, wherein the function is specific to the target CSP.

11. The non-transitory computer readable medium of claim 9, the method further comprising:
    updating, based on the modified API response, the historical API call database to obtain an updated historical API call database;
    after updating the historical API call database:
        obtaining a second API call from the application;
        performing, using the updated historical API call database, a second target CSP analysis to identify a second target CSP to service the second API call;
        performing, based on the second target CSP and on the second API call, a second API call modification to obtain a second CSP API call;
        sending the second CSP API call to the second target CSP;
        obtaining a second CSP API response from the second target CSP;
        performing, on the second CSP API response, a second CSP API response modification to obtain a second modified API response; and
        sending the second modified API response to the application.

12. The non-transitory computer readable medium of claim 7, wherein the target CSP and the CSP are operatively connected via a network.

13. A system comprising:
    a processor; and
    memory comprising instructions, which when executed by the processor, perform a method for managing cloud service providers (CSPs), the method comprising:
        obtaining, by a CSP application broker, an application programming interface (API) call from an application;
        performing a target CSP analysis to identify a target CSP to service the API call, wherein performing the target CSP analysis is based on a historical API call database;

performing, based on the target CSP and on the API call, an API call modification to obtain a CSP API call;

sending the CSP API call to the target CSP;

obtaining a CSP API response from the target CSP;

performing, on the CSP API response, a CSP API response modification to obtain a modified API response; and sending the modified API response to the application, wherein the application and the CSP application broker operate in a CSP.

14. The system of claim 13, wherein the API call is in a format readable to the CSP, and wherein the CSP API call is in another format readable to the target CSP.

15. The system of claim 13, wherein the performing the target CSP analysis comprises:

identifying a function associated with the API call;

making a determination that the target CSP comprises the function; and based on the determination, selecting the target CSP.

16. The system of claim 15, wherein the function is specific to the target CSP.

17. The system of claim 15, the method further comprising:

updating, based on the modified API response, the historical API call database to obtain an updated historical API call database;

after updating the historical API call database:

obtaining a second API call from the application;

performing, using the updated historical API call database, a second target CSP analysis to identify a second target CSP to service the second API call;

performing, based on the second target CSP and on the second API call, a second CSP API call modification to obtain a second CSP API call;

sending the second CSP API call to the second target CSP;

obtaining a second CSP API response from the second target CSP;

performing, on the second CSP API response, a second CSP API response modification to obtain a second modified API response; and sending the second modified API response to the application.

* * * * *